United States Patent
Soto et al.

(10) Patent No.: US 9,863,377 B2
(45) Date of Patent: Jan. 9, 2018

(54) ENGINE HYPER-CONCENTRATOR

(71) Applicants: Manuel Soto, Woodland, CA (US); Cesar Soto, Woodland, CA (US)

(72) Inventors: Manuel Soto, Woodland, CA (US); Cesar Soto, Woodland, CA (US)

( * ) Notice: Subject to any disclaimer, the term of this patent is extended or adjusted under 35 U.S.C. 154(b) by 280 days.

(21) Appl. No.: 14/545,121

(22) Filed: Mar. 26, 2015

(65) Prior Publication Data
US 2016/0281658 A1    Sep. 29, 2016

(51) Int. Cl.
*F02M 25/12*    (2006.01)
*F02M 23/00*    (2006.01)

(52) U.S. Cl.
CPC .......... *F02M 25/12* (2013.01); *Y02T 10/121* (2013.01)

(58) Field of Classification Search
CPC ........ F02M 25/12; F02M 23/00; F02B 41/00; F02B 23/00
See application file for complete search history.

(56) References Cited

U.S. PATENT DOCUMENTS

| | | | |
|---|---|---|---|
| 7,543,577 B2 * | 6/2009 | Ha .................... | F02M 25/10 123/585 |
| 2004/0055585 A1 * | 3/2004 | Smolarek .......... | F01N 3/0807 123/585 |
| 2005/0199231 A1 * | 9/2005 | Heider ............... | F02M 25/12 123/585 |
| 2008/0115773 A1 * | 5/2008 | Gaur ................. | F02M 23/00 123/585 |

* cited by examiner

*Primary Examiner* — Jacob Amick (57) ABSTRACT

A process and device for using a PSA oxygen concentrator to provide a high oxygen air intake mass into the combustion chambers of an ICE in order to improve gasoline mileage, reduce undesirable exhaust components and allow a TWC to come into full operation more quickly. A method of improving the quality of an air mass taken into the PSA device is taught. Both a retrofit methodology using commercially available PSA concentrators and a method of using component parts of same to create a differing architectural arrangement suited to fit the particular needs or spaces are presented.

2 Claims, 3 Drawing Sheets

ENGINE HYPER-CONCENTRATOR

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

REFERENCE TO RELATED APPLICATIONS

This application claims the benefit of U.S. Provisional Application No. 61/972,467 filed on Mar. 31, 2014.

FIELD OF THE INVENTION

In general: This invention relates to U.S. Class 95, gas separation processes including subclass 43 separation of gases, which could include sieve bed separation involving a use of an adsorptive media that selectively separates components of a gas stream under specific conditions; and subclass 45 dealing with the selective diffusion of gases through substantially solid barriers (e.g. semipermeable membranes); and subclass 397 gas separation processes involving a control means responsive to sensed conditions for control of gas flow. Finally, is a relation to Class 431 Combustion, more specifically subclass 115 which deals with an apparatus having means defining means defining a distinct path or passage communicating with a region of combustion and through which combustion products are delivered to the feed line or to the feed inlet zone of the region.

More Specifically: This invention relates to a provision of an improvement of a combustion process in an internal combustion engine ("ICE") and a reduction of undesirable components of an exhaust gas resulting from such combustion process.

And Most Specifically: This invention relates to a use of at least one oxygen concentration unit ("Concentrator") comprising in part a filtered ambient air intake component, and further comprising in part a purge tube component as a part of a Pressure Swing Adsorption device ("PSA").

Said filtered air intake component of said Concentrator comprising an attachment at an outer wall portion of an enclosure housing said Concentrator which said attachment allows of a passage of said terminal orifice through said outer wall element such that said orifice is in a direct contact with an externally situated ambient, environmental air mass, and which said environment air source is separate from an air mass in any internal compartment of a vehicle or of any other structure housing said PSA A terminal orifice of said purge tube component comprising an attachment at an outer wall portion of an enclosure housing said Concentrator which said attachment allows of a passage of said terminal orifice through said outer wall element such that said orifice is in a direct contact with an ambient, externally situated environmental air source, and which said environmental air source is separate from an air mass in any internal compartment of a vehicle or of any other structure housing said PSA; said attachment of terminal orifice of said purge tube component, as far as is practical, being placed in a situation at a remove from said attachment of said filtered air intake component.

Said Concentrator, may be enclosed within a non-moveable structure for a use in a stationary ICE, or, within an enclosed component of a body section of a motor vehicle; in either event, said Concentrator is in an operation for a purpose of providing a conversion of a chemical force to a mechanical force through an operation of said ICE;

A specific functional usage of said Concentrator within a motor vehicle leading to a creation of an increase in an oxygen content level of an incoming ambient air mass (O2-A) to a level of between 70% and 99%, resulting thus in a creation of a first phase oxygen enriched air mass (HI-OSub2-1); following which an introduction of that HI-OSub2-1 into an air intake manifold of an ICE leads to an admixture with a volume of O2-A air already present in said air intake manifold, creating thus a second phase oxygen enriched air mass, a pre-combustion oxygen enriched air mass (HI-OSub2-2), said HI-OSub2-2 having an oxygen concentration higher than that of a similar volume of O2-A air in a surrounding environment; which said HI-OSub2-2 is next brought into an ultimate contact with a fuel, leading to a formation of a high Osub2 air-fuel mixture (Hi-O2-Fuel mix), a combustion of said Hi-O2-Fuel mix next follows within at least one combustion chamber of an ICE; following which an exhaust assembly provides for a passage of an exhaust gas stream out of said ICE into the environment.

Said purge tube component arising from an attachment with said Concentrator, within which said Concentrator a purgation step is involved as part of said functional usage of said Concentrator; said purgation step involving an expulsion of a HI-N-low-OSub2 air mass through said purge tube component into an air mass external to an engine housing component of or any another internal body section component of a structure housing said Concentrator.

BACKGROUND OF THE INVENTION

The operation of ICEs to power vehicles of transportation and for other uses consumes much of the world's energy. Most such ICE's are only 20-30% efficient and a major portion of the fuels used are wasted. This leads to depletion of global resources and creation of excessive amounts of pollutants and greenhouse gases. Allegedly this is caused because the combustion process inside either a spark ignition gasoline engine or a compression ignition diesel engine is too slow relative to a power stroke of the engine. (U.S. 20110247585 [003]; now U.S. Pat. No. 8,176,900)

For a purpose of creating a motive force an ICE typically employees a combustion chamber or a plurality of combustion chambers. Such ICEs have seen a use in a powering of a wide variety of devices, in which the combustion is intermittent, including, but not being exclusively limited to a usage in: a land transport vehicle, a marine vehicle, a boiler arrangement, a pumping device, an incineration device, a powering of a turbine; in such usage, most such ICEs derive power from a use of an energy dense fuel such as gasoline or diesel, liquids derived from fossil fuels, more currently some bio-fuels have entered the field for a use in powering cars, motorcycles, aircraft, boats and a wide variety of recreational vehicles. The combustion process is typically brought about under a condition of both high heat and high compression.

ICE's are also used in continuous combustion engines such as gas turbines, jet engines and even in some rocket engines which operate on the same principal of an admixing of a fuel with an air mass in a combustion chamber as a means to provide a power of propulsion for a mobile vehicle, or, a power for a transformation of a chemical energy into a mechanical energy as a work output of a stationary device.

As part of the chemical reactions involved in the combustion process, a certain amount of undesirable exhaust emissions occur. These emissions can cause serious environmental pollution and present hazards to human health. Therefore the controlling of partially-oxidized hydrocarbons (HC), less than fully combusted carbon as carbon monoxide (CO) and nitrogen oxides (NOx) can have a direct effect in controlling photochemical smog and its associated problems.

Many processes and methods have been developed in order to lower undesirable exhaust emissions. A major effort has focused on the removal of HC and NOX by use of: three way catalytic converters (TWCs) to remove pollutants created during the combustion process before they exit into the environment; the greatest efficiency occurs with the combined use of TWCs along with a preventive measure in the form of using electronic fuel injectors that are regulated by a microprocessor which receives signals from an exhaust gas sensor as part of an engine control unit (ECU); this latter process regulates the combustion to satisfy several needs, including reduction of the formation of undesirable exhaust emissions.

One problem with TWCs is that they operate most efficiently at high temperatures and so, at the initial startup of an ICE, the catalytic converter does almost nothing to reduce exhaust pollutant. It is noteworthy that, as taught in U.S. Pat. No. 5,908,023, an oxygen enriched air stream supplied to an ICE causes an elevation in the exhaust-gas temperature such that the start time of the catalytic converter in the vehicle is reduced and the catalytic converter reaches it's full operating temperature more quickly.

An oxygen enriched air stream also provides a decrease of the raw exhaust emissions including CO and HC from the ICE into the exhaust system because of the improved fuel combustion. NOX is reduced because the process of preparing Hi-Osub2 is paralleled by a removal of N in the air stream.

The use of fuel injection technology allows control and improvement of several functional objectives such as: regulation of Power output, improvement of Fuel efficiency, greater control of Emissions, Drivability and smooth operation of the motor vehicle, range of environmental operability and engine tuning.

A specific example of a "preventive" approach to further improving fuel injection performance is found in U.S. 20110247585. The invention leads to further reduction of NOX, and also improves engine performance: the improvement is essentially created because, in operation, the fuel injector is led to precisely meter an ignition of HI-OSub2-2 in a fast burn zone in which a leading surface of the fuel is completely burned at a close proximity to the top of the combustion chamber within several microseconds.

An example of the post-combustion control of undesirable combustion byproducts, especially carbon monoxide, is found in U.S. Pat. No. 3,862,540 which teaches: " . . . an air injection system injecting supplementary air into the exhaust manifold of an internal combustion engine for the purpose of oxidizing the unburned exhaust emissions, thereby reducing the emission of undesirable pollutants. (U.S. Pat. No. 3,862,540 Abstract). Generally, the air should be delivered to the exhaust manifold at a rate such that the oxygen content of the injected air is slightly higher than that necessary for complete oxidation of the emissions. This final oxidation process can take place in a normal exhaust manifold or can be enhanced through the use of thermal and/or catalytic reactors. (U.S. Pat. No. 3,862,540 Background of the Invention).

The following patents, also of the "preventive" type of action, typify the use of fuel additive compositions used for the purposes of improving stability of stored fuels and reducing undesirable exhaust emissions: U.S. Pat. No. 7,887,604 (Microemulsion Nanotechnology Fuel Additive); U.S. Pat. No. 7,977,287 (Microemulsion (Nanotechnology) Additive To Oil); US 20050257420 (Composition As An additive To Create Clear Stable Solutions And Microemulsions With A Combustible Liquid Fuel To Improve Combustion).

Turbochargers, Superchargers and Turbosuperchargers all act to increase engine power by forcing O2-A air into an ICE at increased density or volume. Some use exhaust gases to drive turbines for compressing the air. There is no great increase in the oxygen level of the air mass being forced into the engine's carburetion process.

Devices and processes for a creation of a Hi-Osub2 content from an O2-A are well known in the art of medicine wherein they are used for a wide range of purposes. Such uses include provision of Hi-Osub2 level air for persons having breathing problems such as COPD and other medical conditions, as well as for use in accelerating the healing of flesh wounds and burns.

Many US patents teach a medical use of devices and processes that utilize a sieve bed containing an adsorptive component for selectively adsorbing and removing a substantially absorbable component, typically nitrogen, of an air mixture while allowing a passage forward of an Osub2 component of that air mixture and thereby creating a Hi-Osub2 air mass for use by persons requiring an intake of oxygenated air of higher Osub2 than that found in ambient air, such include: U.S. Pat. No. 8,900,353; U.S. Pat. No. 8,888,902; U.S. Pat. No. 8,753,435; U.S. Pat. No. 8,702,041; U.S. Pat. No. 5,917,135; U.S. Pat. No. 8,568,519; U.S. Pat. No. 8,388,745; U.S. Pat. No. 8,337,181; U.S. Pat. No. 7,837,761; U.S. Pat. No. 6,691,702; U.S. Pat. No. 5,906,672, U.S. Pat. No. 4,971,609, U.S. Pat. No. 4,491,459 and U.S. Pat. No. 3,930,814 among a long list of others.

As far back as October 1956, a process was taught using a pair of cylindrical containers filled with an adsorbent material for removal of a liquid from a gas stream; in that instance the purpose was to dry gas in delivery lines. (U.S. Pat. No. 2,765,868). U.S. Pat. No. 3,696,588 (1972) taught a similar arrangement in a use for separating liquid out of compressor lines, brake lines and such.

U.S. Pat. No. 6,691,702 (Appel, Feb. 17, 2004) makes specific reference to the use of the oxygen that has been concentrated for ailments that affect the respiratory system, heart disease and AIDS; U.S. Pat. No. 4,491,459 (Pinkerton, Jan. 1, 1985) makes reference to the use of the enriched Osub2 for purposes of treating respiratory ailments such as emphysema and pneumonia; U.S. Pat. No. 3,930,814 (Gessner, Jan. 6, 1976) references the use of the HiOsub2 in the treatment of patients suffering respiratory ailments, such as emphysema.

So, there is a long history of an adsorbtive media bed process being used to create Hi-Osub2 for a use in the art/field of medical practice.

On the other hand, very few US patents teach a use of Oxygen concentration devices and processes that are specifically intended for use in improving the performance if ICEs and for reducing exhaust pollutants from vehicles ucing ICEs. Two such are, U.S. Pat. No. 7,337,770 (Moon) and U.S. Pat. No. 5,908,023 (Stutzenberger).

However, neither U.S. Pat. No. 7,337,770 (Moon) nor U.S. Pat. No. 5,908,023 (Stutzenberger) teach or use a device or process involving a use of a sieve bed containing an adsorptive component for selectively adsorbing and removing a substantially absorbable component of an air mixture while allowing a passage forward of an $Osub2$ component of that air mixture and thereby creating a hi-$Osub2$ air mass. Instead, both Moon and Stutzenberger teach a reverse osmosis process involving the ability of and a use of a permeable membrane to selectively disallow a passage of one component of an air mixture from passage through the membrane while simultaneously allowing another component to pass forward through the membrane, thus increasing the percentage of the component that passes through the membrane relative to any component in the original air mass for which passage forward has been diminished or eliminated.

Effectiveness of the Involved Technology

Several studies have evaluated the effect of Hi-$OSub2$ on engine performance and emissions of ICEs, one such paper was Paper No. 932840 DOI: 10.4271/932804 Maxwell, T., Setty, V., Jones, J., and Narayan, R., "The Effect of Oxygen Enriched Air on the Performance and Emissions of an Internal Combustion Engines," SAE Technical Paper 932804, 1993, doi:10.4271/932804; presented at the *International Fuels and Lubricants Meeting and Expositions* meeting in October of 1993, The Abstract of that paper provided the following:

"The effects of oxygen enrichment were evaluated in terms of power output, specific fuel consumption, fuel conversion efficiency, exhaust gas temperature, and exhaust emissions (carbon monoxide and hydrocarbons). Test results indicate that the use of oxygen enriched air produces a significant increase in power output, improved fuel conversion efficiency, lower specific fuel consumption, higher exhaust gas temperature and a substantial reduction in carbon monoxide and hydrocarbon emissions when the engine is fueled with either gasoline or natural gas."

Several research sources report the same benefits accruing when using a diesel fuel.

"Results and Conclusion: Increasing the oxygen content with the air leads to faster burn rates and the ability to control Exhaust Emissions. Added oxygen in the combustion air offers more potential for burning diesel. Oxy-fuel combustion reduces the volume of flue gases and reduces the effects of green house effect also." (*American Journal of Environmental Sciences* 7 (2): 136-140, 2011 ISSN 1553-345X © 2010 Science Publications);

"Results and Discussion: . . . oxygen addition, whether it comes from intake air enrichment or via oxygenated fuel, reduces soot even though the extent of PM reduction varies remarkably with oxygen addition method. For the equivalent level of oxygen addition based on oxygen to carbon ratio=5.1, intake air oxygen enrichment was more effective for reducing soot than fuel-bound oxygen addition." (COMPARISON OF THE IMPACT OF INTAKE OXYGEN ENRICHMENT AND FUEL OXYGENATION ON DIESEL PARTICULATE EMISSIONS Juhun Song,) Vince Zello and André L. Boehman The Energy Institute The Pennsylvania State University 405 Academic Activities Building University Park, Pa. 16802 Philip John Young and Francis J. Waller Air Products and Chemicals, Inc. Allentown, Pa.

"ABSTRACT: . . . By increasing OXYGEN content with air leads to faster burn rates and ability to burn more fuel at the same stoichiometry. Added oxygen in combustion air leads to shorter ignition delay and offers more potential of burning diesel. Oxy-fuel combustion reduces the volume of fuel gases and reduces the greenhouse effect also. During study of available material it is found that oxygenated air is an effective method for reducing PM, CO, HC without significant increase in NOx emission." (Waghmare et al., International Journal of Advanced Engineering Technology E-ISSN 0976-3945; POWER ENHANCEMENT USING OXYGEN ENRICHED AIR: A CRITICAL REVIEW).

Conclusion:

Accordingly, it has been established that a process of creating an elevation of the $OSub2$ content of a pre-combustion air mass for a use in an ICE leads to a set of results that are of a benefit to a user of the ICE and as well, provides a set of benefits to the society at large in terms of improving personal health and decreasing the level of environmental degradation that would otherwise have occurred.

Comparative Evaluation of Adsorbent Bed Vs. Membrane Technologies for Creation of High $Osub2$ The next two informational sources are speaking to the separation of N2 from an air mass and the exclusion of an $Osub2$ component, their purpose is to save Nitrogen for commercial uses. Which component of a gas is the "saved" component, and which the ultimately "purged" component does not negate any of the research data.

The target subsection of the original gas is determinable by the selection of the input vs the exhaust side of the equation and the selectivity of the media chosen for use in elimination of one or the other of the gaseous subcomponents. This choice results in a direct relationship between the saved and the excluded; that is, a higher selectivity of $OSub2$ on one side of the separator media, means a higher level of the excluded gaseous component on the other side of the ledger, and the choice of which to send into an intended receiving vehicle and which to exhaust is a matter of choice.

HOLLTEC, LLC manufactures nitrogen generators based on both the Pressure Swing Adsorption ("PSA") and Membrane Separation processes ("MSP"). In their on-line presentation viewable at http://www.holtecllc.com/our-products/technology-comparison.html; they present, inter alia, the following information:

In comparing the "Initial Investment" aspect using the two systems: MSP systems may be slightly less affordable or similar in cost to PSA systems when considering use of a very small unit. However, PSA systems will typically have a greater capacity of output than MSP systems of similar cost. They recommend replacing the filter media every 1-2 years for both types of separators. Size of MSP systems is typically smaller than PSA systems for production of N2 up to 90% purity; however, PSA systems may be smaller at higher flow and purity levels.

GAZCOM, LLC, another manufacturer argues that PSA systems are the best choice, even for N2 generation, because PSA generators offer a number of operating and cost related advantages relative to MSP generators. Further, PSA units are more robust and suitable for harsh environments than are MSP units. Specifically, units offer up to a 99.5% purity of product and can reach a level of 99.99% purity as opposed to MSP units that seldom reach a level above 94% purity. Also, PSA units consistently produce the same amount of product whereas the capacity of MSP unit output weakens over time. And finally, over time the maintenance costs for MSP units is on average 50% higher than the maintenance costs for PSA units. This is so because of the relatively long life of PSA adsorbent materials such as Zeolitic products that can easily perform at optimal levels of separation for up to 10 years, whereas membranes start to deteriorate from the first usage and are expensive to replace.

The next on-line resource http://www.thecompressedair-blog.com/pressure-swing-adsorption-vs-membrane-technology-for-on-site-gas-generation/ is again focused on Nitrogen generation. The presentation addresses PSA Vs. MSP generators for "On-Site Gas Generation." They state that PSA units utilizing Zeolitic adsorbents produce levels of N2 purity of "up 99.999%" which levels are suitable for uses "that demand" the highest purity of N2. MSP units achieve purity levels of between 90 and 95 percent that is suitable for many industrial uses where less purity is demanded. Again, in consideration of the fraction of gas that is saved vs. that which is discarded or directed elsewhere, achieving higher N2 levels means that higher levels of OSub2 have been directed elsewhere, to the advantage of a party wishing to use a higher level OSub2 product if they focus on the recovery of the OSub2 component instead of the N component.

The following on line resource http://www.ou.edu/class/che-design/a-design/projects-2007/Oxygen %20Generator-Presentation.pdf discusses PSA systems and is entitled 99% Oxygen Production with Zeolites and Pressure Swing Adsorption: Designs and Economic Analysis Presentation by: Blake Ashcraft Jennifer Swenton. The presentation presents the following data: OSub2 is the third most widely used chemical in the world, and the main applications are for Medical uses by individuals and hospitals, and, for industrial uses in refineries and processing plants. The authors, in agreement with the prior resources state that OSub2 recovery rates are higher with PSA technology than with MSP processes.

Conclusion:

Accordingly, it has been established that a PSA technology is a better choice than an MSP process for a purpose of a creation of an elevation of the OSub2 content for an injection into an air intake manifold of an ICE for a purpose of a creation of an elevation of the OSub2 content of a pre-combustion air mass for a use with a fuel in a combustive process in an ICE, a use of a PSA Condensing system is thus seen to be of a benefit to a user of the ICE, and as well, provides a set of benefits to the society at large in terms of improving personal health and decreasing the level of environmental degradation that would otherwise have occurred.

Typical PSA Unit Components and Operating Process

For a typical use in providing a high oxygen content air stream to medical patients having breathing related problems the following known elements of such a usage comprises the following known components and elements or steps: a pressure swing adsorption (PSA) process is used in an operation within an oxygen concentrating assembly (a Concentrator); said high oxygen content air mass being achieved by a separation of a nitrogen (N) component from an oxygen component of an air mass by an adsorptive process within a media, typically a zeolitic material, which said media is in a containment within a pair of media containment compartments (sieve beds) within said Concentrator; as said process proceeds, an oxygen ("OSub2") component of the air mass is concentrated under pressure and reaches a high level of pure oxygen in that air mass. This process involves basic components and procedural steps:

Components:

An external housing having an integral filtered air intake portal and an integral waste air purge outlet; said housing further comprising a set of seven control valves as well as a pair of sieve beds, a sieve bed-1 and a sieve bed-2 each of which said sieve beds has an entry portal and an exit portal and each of which said sieve beds is filled with a media, said media most commonly comprising a Zeolitic material;

said housing further enclosing a battery, an air compressor and a set of tubular components which carry an ambient air from said filtered air intake portal to said air compressor; a compressed air exit tube from the compressor eventually ending in an interconnection with a separate intake portal tube of a first sieve bed and a separate intake portal tube of a second sieve bed; said tubular components further comprising in part an exit portal tube of sieve bed-1 and an exit portal tube of sieve bed-2, which said exit portal tubes, after continuing a distance forward, come into a common junction at an exit portal cross connector tube, which said exit portal cross connector tube is also in a conjunction with an oxygen enriched air exit portal of the Concentrator;

a pair of valves on said exit portal cross connector tube serve to determine which of said sieve beds will be open to said oxygen exit portal at any given time;

a cross connector attachment between said outlet tubes of said sieve bed-1 and said sieve bed-2 further comprises a pressure dependent control valve that allows a flow of a small amount of air from one tank to the other in a direction topposite to the tank then receiving pressurized air from said air compressor;

a pair of valves on said compressed air exit tube of said air compressor controls a flow of pressurized air either to sieve bed-1 or to sieve bed-2; a cross connector tube between said intake portal tubes of sieve bed-1 and sieve bed-2 is itself in an interconnection with said purge tube component of said Concentrator;

a pair of valves on said cross connector tube between said sieve bed-1 and sieve bed-2 intake portal tubes provides a control of which sieve bed has contact with the purge tube component of the device.

Operating Process an ambient air mass is drawn in through a filtered air inlet, by an action of an air compressor driven by an electrical current, which said electrical current is provided by either a standard AC outlet, or, by a battery operating in concert with a DC-AC power converter; and in which said air inlet is an integral part in and of a body component of said Concentrator; a coordinated, alternating opening and closing of a set of valves leads said incoming air mass through a set of interconnected tubes into a first sieve bed, and prevents pressurized air from entry into a second sieve bed; each of said sieve beds is filled with an identical adsorbent material; as a pressure level increases in said first sieve bed, N is adsorbed onto said media, resulting in an increased level of oxygen in said air mass as it is compressed within said first sieve bed; as an oxygen pressure gradient increases in said first sieve bed, a high oxygen content air is led out from said first sieve bed into an oxygen enriched air hose for delivery to said patient who is using said Concentrator;

concomitantly, a low pressure in said second sieve bed allows a de-adsorption of any N that had previously been adsorbed and a small incoming amount of high oxygen air that is directed to pass into said second bed allows said released N to escape through a purge outlet and into the environment. This process is repeated at previously determined time intervals and is able to deliver an almost continuous stream of high quality oxygen air to said medical user of said Concentrator.

SUMMARY OF THE INVENTION

Discussion of a Solution to a Problem not Addressed in the Prior Art

It is noteworthy that modern ICE's use a regulated air intake system in which the incoming ambient air is drawn from the external environment through a dedicated air intake system within which intake system, after passage through a filter, the air stream passes into a tube that goes directly to the pre-combustion area without exposure to the air in the engine compartment zone. This provides the least contaminated and coolest source of air for the combustion process. If the air was drawn from within the engine compartment of the ICE it would be hotter and it would contain contaminants particular to that area.

A hotter air source is more expanded than a cooler one and, in essence a given volume of the hotter air mass would have a lower oxygen content than would a similar volume of a cooler air mass. Also, especially in older vehicles, the contaminants particular to the engine area would provide more work for the purification processes involved in providing an exhaust clean enough to pass inspections.

Contaminants located in the engine compartment can include volatile emissions from the fuel and engine lubrication systems as well as breakdown products associated with the aging of metals, plastics and rubber materials; there can also be ambient air contaminants arising from the road surface below the vehicle.

Accordingly, any device or process intended for a use in a provision of a Hi-OSub2 air mass for a use within a combustion process in an ICE should provide an intake ambient air mass from an external ambient air source that is drawn from outside any internal compartment of the vehicle in order to ensure that no additional pollutants to those already present in the incoming engine air intake are introduced into the oxygen enrichment unit. Similarly, any exhaust of a purged waste air should be out-let into an external ambient air source in order to prevent such waste air from being re-taken in by said intake air and to eliminate said exhaust gas admixture into any internal compartment of a housing of an ICE, be it in a transportation vehicle or in a stationary use structure. This is equally true whether the unit operates on a reliance on a MSP or a PSA process.

There is no teaching, suggestion or motivation in these prior art examples that would have led one of ordinary skill to modify the prior art reference or to combine prior art reference teachings to arrive at the invention as claimed in this application in which both a filtered air intake component and a waste air purge outlet hose are taught as a limitation wherein each of said intake and outlet components are limited in a manner of their structural configurations as well as of their physical placements relative to an external surface of an enclosing body or housing component of a vehicle or other ICE housing such that an external face of the filtered air intake and an external face of the waste air purge outlet hose are each in a direct exposure to an external ambient air source by a means of their attachments to an external wall of said enclosure.

There is no teaching, suggestion or motivation in U.S. Pat. No. 5,908,023 (Stutzenberger) that would have led one of ordinary skill to modify the prior art reference or to combine prior art reference teachings to arrive at the invention claimed in this application. In fact, despite 17 line item references to an enrichment channel which is designated as character 30 in the description of a preferred embodiment, and which is seen in the sole drawing as character 30; the invention fails to teach, describe, or even indicate the preferred location of the origination of the "enrichment channel" component of the unit. The only descriptive reference is that it is an "enrichment channel opening into said intake channel" (Claim 1) and: an "enrichment channel which can be subjected to ambient air and which opens into the intake channel of the engine." Column 2 @ line 52. Neither of which limits the intake of air into the oxygen enrichment unit as originating from an ambient air source outside of the confines of the engine compartment.

There is no teaching, suggestion or motivation in U.S. Pat. No. 7,337,770 (Moon) that would have led one of ordinary skill to modify the prior art reference or to combine prior art reference teachings to arrive at the invention claimed in this application. The only reference made as to an air intake for the reverse osmosis unit is: "Ambient air is supplied to the reverse osmosis unit via an ambient-air inlet . . . " or a variant of same. No where in the disclosure or the claims is there any limitation to the effect that an ambient air is derived from a location outside the confines of the vehicle's engine compartment. The only graphic demonstrations of the claimed ambient-air inlet is the appearance of an arrow, the tip of which is touching the outer perimeter of another component of the reverse osmosis unit.

EXPERIMENTAL CONSIDERATIONS

The invention has been used for testing purposes in several vehicles since the filing of Provisional Application No. 61/972,467. During that time it was noted that the various vehicles, including a 1994 Honda Passport SUV with a V-6, fuel-injection engine and a 1996 Ford F250 pickup with a fuel injection V-8 engine; all had similar responses to the added use of this claimed invention: in all instances, gas mileage per tank of gasoline was improved; the vehicle was more immediately responsive to application of pressure on the gas pedal at a lower pressure of application; the oil appeared clearer and less of needing to be changed for longer periods of time than before use of the device.

EXPERIMENTAL FINDINGS

For purposes of this application the following experiment was performed.

A 1994 Pontiac Firebird with a V-6 fuel-injection engine was the vehicle used in this test procedure. A pair of oxygen condensers were used in concert; one 5 Gallon condenser and one 10 gallon condenser. The oxygen enriched air supply hose from the Condensers was tee'd directly onto an inlet atop the air manifold of the engine.

A "Smog Check Vehicle Inspection Report" (VIR) was performed on the same vehicle after a first test run (TEST 1) in which no Condenser apparatus was used. Then, another VIR was performed after a test run (TEST 2) in which the Oxygen Condenser apparatus of the current invention was used in the vehicle.

TEST 1 was performed on Mar. 13, 2015 and TEST 2 was performed on Mar. 16, 2015. The test drives were for identical distances and performed on the exact same driving route, and, both tests were performed starting at 11:a.m. The weather on both Test Days was clear with an approximate temperature of 67 degrees Fahrenheit and a relative humidity of 45%. The road travelled was paved and basically level from Woodland northbound to a few miles past Arbuckle Calif. and back, creating an approximate 60 mile round trip back to the gasoline station where the gas tank had been top filled before the test run.

TEST 1 was run on Mar. 13, 2015 without the use of an oxygen concentrator in the vehicle. The gas tank was top-filled and the test drive was begun at 11:00 a.m. As recorded by odometer, the one-way distance driven was 56.95 miles; the pre-test odometer reading was 185,542.35, and the post-test odometer reading was 185,599.30. The initial 5.7 miles was driven on city streets in Woodland, Calif., following which an entry was made onto Interstate Highway 5 heading north towards Arbuckle Calif. The driving speed on highway 1-5 was 65 mph.

Results:

The gas tank was again top-filled and the gallons used recorded. The gas-mileage result of TEST 1 was as follows: 2.0175 gallons. This translates as 28.22 miles per gallon being achieved during TEST 1.

Following driving the vehicle in TEST 1, the vehicle was taken to a licensed California Smog Testing facility. The results of the post TEST 1 VIR will appear for comparison with the post TEST 2 VIR.

TEST 2 was run on Mar. 16, 2015 with the use of an oxygen concentrator in the vehicle. The gas tank was top-filled at the same gas station and using the same pump number as was used for TEST 1. Again, the test drive was begun at 11:00 a.m. As recorded by odometer, the one-way distance driven was 56.95 miles; the pre-run odometer reading was 185,617.5 miles and the post test reading was 185,674.50. Gasoline consumption during TEST 2 was 1.7934 gallons. This translates as 31.75 mpg being achieved TEST 2.

Comparative Results of the Test-1 VIR and the Test-2 VIR

|  |  | % $OSub2$ | HC PPM | NO PPM | MPG |
|---|---|---|---|---|---|
| TEST 1 | 15 mph | 0.4 | 27 | 510 |  |
| TEST 2 | 15 mph | 0.3 | 20 | 322 |  |
| TEST 1 | 25 mph | 0.2 | 12 | 629 | 28.22 |
| TEST 2 | 25 mph | 0.0 | 17 | 209 | 31.75 |

Applicant recognizes that a single test set of a single vehicle does not provide a proof of the observed results, however, since those results are in keeping with the research conclusions already presented in this disclosure, it was felt useful to present these results.

In considering the mpg figures for TEST-1 and TEST-2 the fuel improvement was at a rate of 3.53 miles per gallon of fuel consumed. In an automobile with a standard 15 gallon fuel tank, this means the operator would benefit from an increased driving range of 52.95 miles per tank of gas. The average vehicle in the U.S. is driven approximately 18,000 miles per year (300 sixty mile runs); thus the operator would benefit from approximately 1,059 "free" miles of driving as compared to a same vehicle in an operation without a use of the Condenser apparatus as taught in this invention.

Objects of the Invention

It is an object of this invention to increase the efficiency of burning fuels in I.C.E.s.

A further object is to effect reduction of CO, NOX, unburned hydrocarbon and particulate matter in I.C.E. exhaust gases.

A further object is to allow greater reduction of pollutant exhaust gases during the period before a newly started I.C.E. is warmed up to running temperature.

A further object is to provide a smoother running I.C.E. by optimizing the oxygen level in the air-fuel mixture in the carburetion process.

A further object is to reduce the frequency of oil changes by preventing the changes in viscosity and clarity of the oil brought about by byproducts of the combustion process.

A further object is to allow a quicker acceleration response because of the concentrated level of oxygen in the air-fuel mixture entering the carburetion process.

A further object is to allow a catalytic converter of a vehicle to reach an optimal operating temperature more quickly and to lead to an optimal reduction of any pollutants that a catalytic converter may be expected to remove.

A further object is to provide an ambient air mass to said Concentrator that is drawn directly from an environment external to any housing enclosing a motor block component of said ICE, or of any other enclosed compartment of a body of a vehicle in which said ICE is in use.

Another object is to provide that a Hi-N-Low-Osub2 exhaust purged from said Concentrator is exhausted at a remove from said filtered air intake of said Concentrator, ensuring thus an incoming air stream to said Concentrator that is from an ambient air source without an admixture of said Hi-N-Low-Osub2 into said intake air stream.

These and other objects and advantages will be apparent to those skilled in the art in light of the following disclosure, claims and accompanying drawings.

BRIEF DISCUSSION/SUMMARY OF THE INVENTION

Advantages of the Invention and how it is Superior to and how it Solves Previously Existing Problems that were not Addressed in the Prior Art The present invention, a process and method for a novel use of at least one PSA Oxygen Concentrator device known in the health field art teaches a use of such devices for an improvement of function of ICEs and for a reduction of unwanted exhaust emissions from an operation of an ICE The invention teaches an expansion of a use of a PSA process within a Condenser device into the art field of ICE combustion, wherein such PSA usage was not heretofore in use. The invention's use of a PSA process in a Concentrator device provides a set of advantages over prior art using an MSP process Reverse Osmosis device; said advantages include: a PSA device provides a tested ability to create a higher level of pure OSub2 than do MSP units; an initial cost of the active separator materials, Zeolite products in PSA units, is less expensive than are the membrane separators in MSP units, and the Zeolite lasts longer until a replacement of the media is needed relative to the shorter effective life of the separator membranes used in MSP units and processes.

Thus the application of the use of a PSA unit/process as taught in the current invention provides both a higher purity of the desired end product, a Hi-OSub2 air mass for a use in a combustive process within a combustion chamber of an ICE, and, said PSA unit/process does so at a cost savings to the consumer/user of an ICE.

This invention also serves to provide an awareness of an overlooked problem existing in the prior art and teaches a solution to compensate for that problem as follows: the inventive process involves a pair of limitations designed to provide an optimization of the purity of the HiOSub2 air mass that is to be injected into an air intake manifold of an ICE.

A first of said limitations that aid in an optimization of purity comprises a limitation designed to provide an elimination of any contaminants likely to be found in an ambient air mass being taken into said PSA from within any enclosed body component of a vehicle housing said ICE; and, most specifically an elimination of any contaminants in an air mass taken into said PSA from within an engine compartment of said ICE.

Said first limitation comprising a modification of a location and a structural configuration an air intake filter portion of a filtered air intake tube component of a PSA unit be in a situation of a direct access to an ambient, external environmental air source by a placement of an originating air in-flow surface of said filter is held in an attachment at an external surface of any enclosing body component of said vehicle, and especially including being away from an ICE operating within an engine compartment of said vehicle, and such placement of said air intake filter that said originating surface of said filter be in a situation of direct exposure to an ambient air source, which said ambient air source is in a situation external to any enclosed body component of said vehicle.

A second limitation is to provide an aid in an optimization of purity of an air mass by a Condenser unit using a PSA process by an arrangement of a situation of a purge tube of said PSA shall vent a quantity of purged air into said external environment by a placement of a terminal orifice of said purge tube at an external surface of any enclosed body component of any vehicle or structure housing said ICE, and at a remove from said filtered air intake of said Condenser; and, especially including that said terminal orifice of said purge tube be in a location away from a PSA operating within an engine compartment of said ICE.

General Discussion of the Technological Process Involved in a Usage of the Invention This invention comprises a use of a known technological process, a Pressure Swing Adsorption process within an Oxygen concentrating device ("Concentrator") for a new purpose and as well for a purpose of correcting a problem/deficiency that has not been addressed in the prior art.

Said technological process involving a use of a selective adsorption process technology for a purpose comprising a creation of an oxygen content higher than that of an ambient air mass for a use in a combustion process within an ICE; and in which usage an improvement comprises in part a teaching of a limitation of a placement of and an attachment of an air filter inlet portion of an air intake tube component of a Concentrator unit in a relation to an engine compartment or any other enclosed body component of a vehicle housing said ICE such that an external filter surface of said air filter inlet is held in an attachment to a direct contact with an ambient air mass, which said air mass is in an external situation to any said enclosed body compartments of said vehicle;

Said usage of said known technological process further comprising in part a use of an adsorbent media within at least one media containment chamber ("Sieve Bed") of an oxygen concentrator apparatus into which Sieve Bed and adsorbent media a quantity of ambient air is drawn by an action of a compressor unit which said action of said compressor unit creates a provision of an increase in a level of pressure within said Sieve Bed, leading thereby to a pressure driven adsorption of a nitrogen fraction of said ambient air mass by said adsorbent medium and a coincident elevated concentration of an $O_{sub2}$ content by volume-percent, e.g. a creation of a first HiOSub2 air mass (Hi-OSub2-1) within said Sieve Bed; following which said Hi-OSub2-1 air mass makes a passage out from said Concentrator through an oxygen enriched supply hose connecting said Concentrator to an air intake manifold of an engine of an ICE, wherein said high oxygen content air mass is brought into a contact with and an admixture with a volume of ambient air already in said intake manifold leading to a creation of a second high oxygen air mass (Hi-OSub2-2) within said air intake manifold of said engine, and, following which said Hi-OSub2-2 is brought into a contact with and admixed with a fuel, creating thereby a pre-combustion air-fuel mass (Hi-OSub2-Fuel); said Hi-OSub2-2 providing an action as an oxidizer of said fuel as a part of a process of combustion in said combustion chamber; which said combustion comprises an effect of a transformation of a chemical energy into a useful mechanical energy at a higher level of an efficiency of a use of said fuel and a higher power output per combustive event of said fuel than are the levels of fuel efficiency and engine power output obtained by a combustion performed in that same said combustion chamber in which a quantity of a non-hyper-oxygenated ambient air is in use as an oxidative agent used in a combination with a same said fuel.

BRIEF DESCRIPTION OF THE DRAWINGS

FIG. 3 presents a diagrammatic representation of An Oxygen Condenser seen in a cross section along an X-Axis of the unit. Components shown include representations of the following components: an air inlet, an air compressor, two sieve beds; tubular interconnections between the air compressor, sieve beds and a Hi-OSub2 product exit portal as well as a purge-exit for a Hi-N-low-OSub2 exit portal; relative density of OSub2 is represented by the concentration of circular, letter "o" like markings, while N is represented by diagonal cross hatching similar to /// marks.

BASIC DESCRIPTION OF A PREFERRED EMBODIMENT

Further objectives, advantages and novel features of the invention will be apparent to those skilled in the art from the following detailed description when taken in conjunction with the accompanying drawings illustrating a preferred embodiment of the invention.

A First Embodiment

This embodiment is specifically illustrated for a use in an ICE having a fuel injection system for a provision of a Hi-Osub2-fuel mix into a series of combustion chambers of an ICE.

Figure 1:
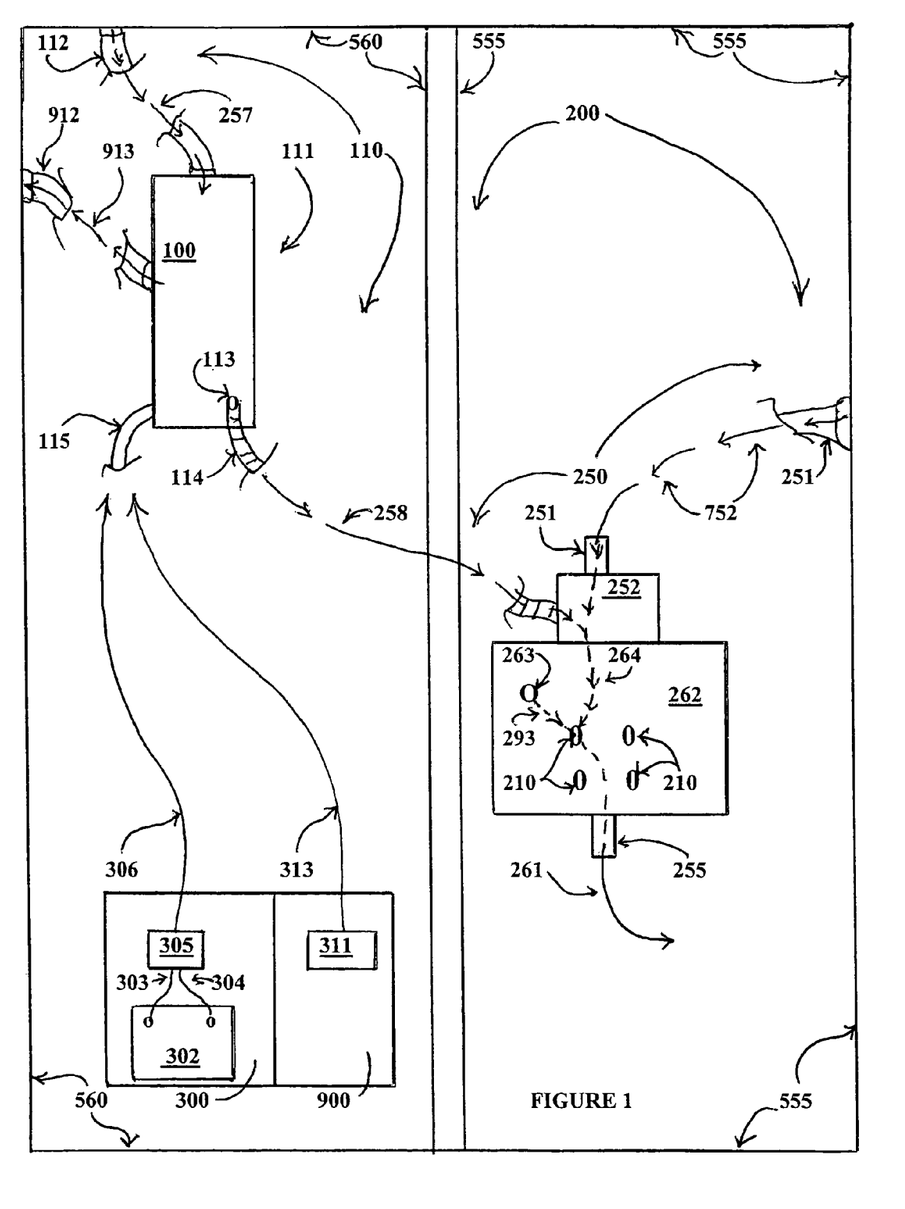
FIG. 1 provides a diagrammatic schema of the significant features of the invention for a use in an ICE utilizing a fuel injection assembly and process; the basic elements shown include a Condenser Unit section as such is taught in the invention; a section representing an Air Intake and a Combustion assembly of an ICE is also presented; and, a third section illustrating two alternative processes of providing power for the Condenser unit are seen. The significant structural details of the invention are included. Details of the internal process of concentrating OSub2 are not seen in this figure.

FIG. 1 shows the essential elements of an Oxygen Concentration assembly 110 for a creation of and a provision of a high-oxygen content air mass by an Oxygen Concentration Unit ("Concentrator") 111 into a combustion assembly 250 of an internal combustion engine ("ICE") 200 by a use of this invention.

Note: In a typical Concentrator for a use in a medical setting, a filtered air intake inlet of a concentrator would appear as an integral part of the body component of the Concentrator where it would be seen as a screened cutout on the face side of said body component. However that view is not depicted in the illustrations. What is depicted in the illustrations is a typical face section of a Concentrator based on the teachings of the current invention in which the filtered air intake is part of an intake tube an opening orifice of which said filtered air intake tube is in a attachment at a surface at some distance removed from the body of the Concentrator.

Said Concentrator 111 comprising in part a Concentrator housing 100, a filtered entry intake hose 112 providing for an entry of a quantity of an ambient air mass (OSub2-A) 257 into said Concentrator 111, which said filtered ambient air entry intake hose 112, is in an externally facing attachment to any surface of any component of an enclosing housing (555/560) of said ICE 200; said externally facing attachment creating a provision thereby for a flow of said OSub2-A 257 directly from a location situated externally to any body component of a vehicle housing said ICE into said Concentrator 111.

Following said passage of said OSub2-A into said Concentrator, a process (to be described later) of a separation of an Oxygen component (OSub2) and a nitrogen (N) component of said incoming OSub2-A 257 is brought to pass, such that a high-nitrogen/low OSub2 (Hi-N-Low-OSub2) 913 gaseous component is purged from said Concentrator through a waste air purge outlet hose 912, and: a highly condensed OSub2 air mass (Hi-OSub2-2) 258 makes a passage forward through an oxygen enriched air exit port 113 of said Concentrator, which said exit port 113 is in an affixation to an oxygen enriched supply hose 114, which said supply hose 114 comes to a termination in an affixation with an air intake manifold 252 of said combustion assembly 250; said combustion assembly 250 of said engine 200 further comprising in part an engine block component 262.

Said combustion assembly 250 further comprising in part, a fuel pump 263, and a set of combustion chambers 210; said fuel pump 263 makes a sequential, injection of a metered quantity of a fuel into each of said set of combustion chambers 210 under a direction of an engine control unit (ECU) (not shown); a quantity of said Hi-OSub2-2 is also sequentially injected into each of said combustion chambers 210 in a metered manner under a direction of said ECU, which said ECU programs said fuel and HiOSub2-2 injections in accord with a timing designed to provide a maximization of a combustion in a sequential manner within said combustion chambers; said combustion assembly 250 further comprising an exhaust assembly 255, which said exhaust assembly in turn affords a passage of an exhaust stream 261 into an external environment; said Oxygen Concentrator assembly 100 further comprising in part an electrical power cord 115 of said Concentrator 110, with said power cord 115 having an origination in a first power source embodiment 300 or a second power source embodiment 900.

A source of a power necessary for an operation of said Concentrator 111 in an ICE 200 for a propulsion of a moving vehicle such as, but not necessarily being limited to an automobile, comprises an electrical current source means, said means comprising ne of the two following options as circumstances demand; a first means is seen in a first power source embodiment 300 of FIG. 1, wherein a power origination source is shown as a battery 302 of said ICE 200, said power source 300 further comprising in part a pair of battery output cables 303, 304 which said battery output cables are seen in an attachment to a DC-AC Power Inverter ("Inverter") 305, said pair of battery cables being seen as comprising a positive pole battery output cable 303 and a negative pole battery output cable 304, an AC output cord 306 of said DC-AC Inverter 305 is seen leading to a connection to said power cord 115 of said Concentrator 110.

In a second means a second power source embodiment 900, for an operation of an ICE designed for and used in a stationary position, an origination of said power is shown comprising an alternating current ("AC") power source receptacle 311, from which said receptacle 311, an AC Power cord 313, is seen leading to a connection to said power cord 115 of said Concentrator 110.

A Second Embodiment

Figure 2:
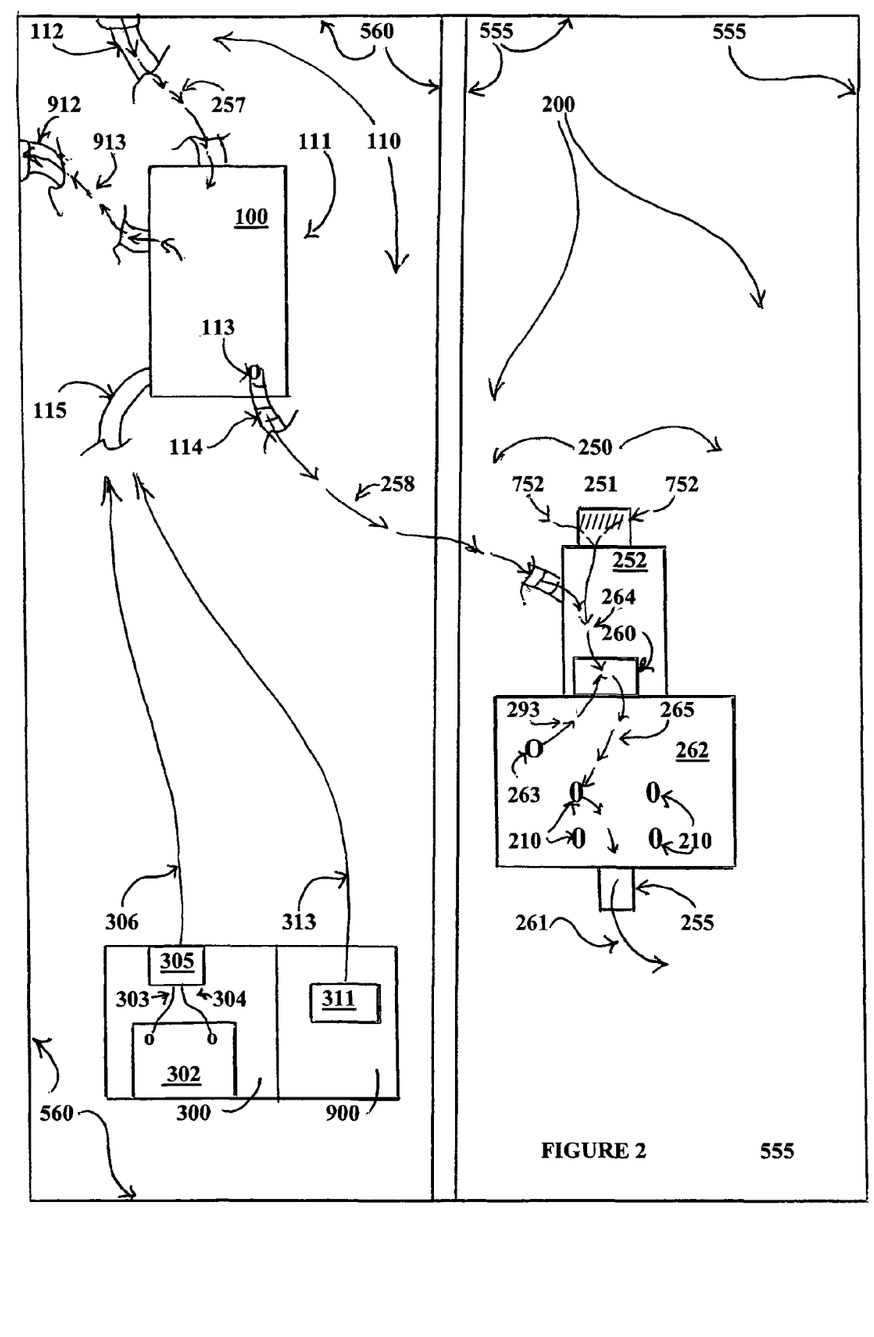
FIG. 2 provides a diagrammatic schema of the significant features of the invention for a use in an ICE utilizing a carburetor in the combustion assembly and process; the basic elements shown include a Condenser Unit section as such is taught in the invention; a section representing an Air Intake and a Combustion assembly of an ICE is also presented; and, a third section illustrating two alternative processes of providing power for the Condenser unit are seen. The significant structural details of the invention are included. Details of the internal process of concentrating OSub2 are not seen in this figure.

This embodiment is specifically illustrated for a use in an ICE having a carburetor system for a provision of a Hi-Osub2-fuel mix into a series of combustion assemblies of an ICE As seen in FIG. 2 an embodiment designed for a use in an ICE 200 utilizing a carburetor 260 in a combustion assembly 250 of said ICE 200, after a passage of a mass of ambient air (OSub2-A) 257 through a filtered air intake hose 112 of said Concentrator 111, which said filtered ambient air entry intake hose 112, is in an externally facing attachment to a surface of any component of the enclosing housing (555/560) of said ICE 200; which said externally facing attachment creates a provision thereby for a flow of said OSub2-A 257 directly from a location situated externally to any body component of a vehicle housing said ICE and thence a passage into said Concentrator 111; within which said Concentrator a process (to be described later) of a separation of an Oxygen component (OSub2) and a nitrogen (N) component of said incoming OSub2-A 257 is brought to pass, such that said process leads to a high-nitrogen/low OSub2 (Hi-N-Low-OSub2) 913 gaseous component being purged from said Concentrator through a waste air purge outlet hose 912, and: a highly condensed OSub2 air mass 258 makes a passage forward through said Condenser 111; following which, said HiOsub2-1 air 258 makes a passage out of said Concentrator 111 through an oxygen enriched air exit port 113 and thence into an oxygen enriched supply hose 114 following which said Hi-Osub2-1 air makes a passage into an air intake manifold 252 of said ICE 200, where it is admixed with a quantity of O2-A 752 that has made an entry into said air intake manifold 252 through an air filter component 251 of said combustion assembly 250, said air filter component typically being within an engine compartment 555 of said ICE as shown in FIG. 2, however, a conversion via an externally attached filtered air entry portal (not shown) would lead to further improvement of the quality of the in-taken air mass); creating thereby a second high oxygen level air steam (Hi-Osub2-2) 264 within said intake manifold 252, following which said Hi-Osub2-2 makes a passage into a carburetor 260 of an engine block component 262 of said ICE 200, and, within which said carburetor 260 said Hi-Osub2-2 is brought into a contact with and an admixture with a fuel component 293, forming thereby a Hi-O2-Fuel mixture 265, after a passage of which said Hi-O2-Fuel mixture 265 into a combustion chamber 210 of said combustion assembly 250 from an origination in a fuel pump 263, a combustion of said Hi-O2-fuel mix 265 is brought about, and thence, following said combustion of said Hi-O2-Fuel mix within said combustion chamber 210, an exhaust stream 261 makes a passage out through an exhaust channel (not shown) in said engine block 262 and thence into an exhaust assembly 255 and ultimately into the surrounding environmental air.

Description of a Typical PSA Compressor Unit and Process of Operation

As taught herein, a Pressure Swing Adsorption (PSA) unit uses a Zeolitic sorbent material as the media for removal of N from an air mass with an OSub2 component being concentrated to form a high OSub2 air mass. The process involves a use of at least two media chambers, aka: Sieve beds, adsorption columns, etc., the use of at least two sieve beds allows for a process of a semi-continuous operation in a provision of a Hi-OSub2 air injection into a combustion process of an ICE.

Figure 3:
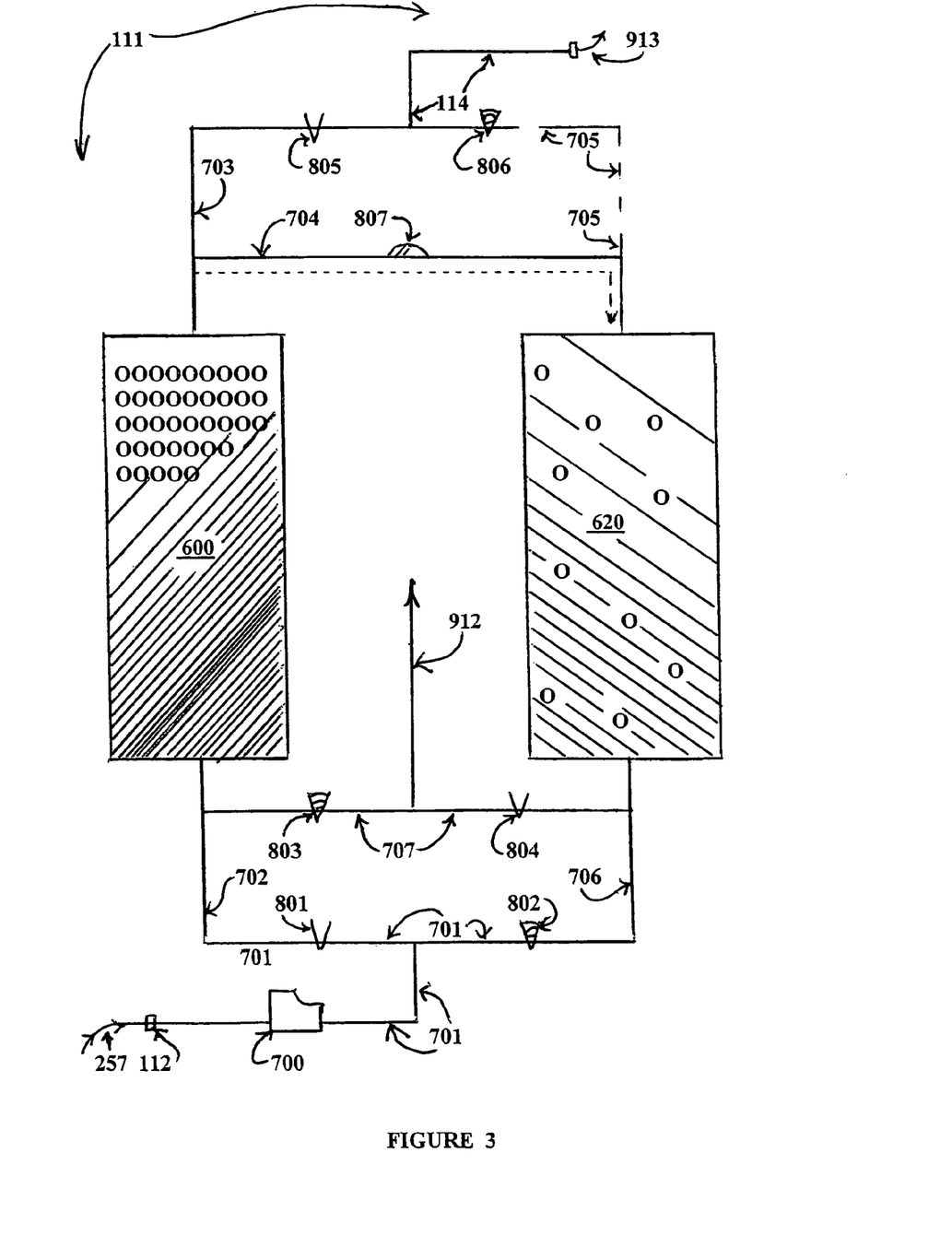

A process comprising a use of a PSA process in an oxygen concentration device (Concentrator) is simply stated as follows and as illustrated in FIG. 3:

1. In use of a Concentrator in an engine of an ICE, a quantity of ambient air mass OSub2-A 257 is drawn in through a filtered air entry intake hose 112, an originating end of which said filtered intake hose being in a direct contact with an ambient air source, which said ambient air source is in a location outside of an engine enclosure section or any other enclosed body compartment of a vehicle 560 in which said Concentrator is located; after a passage of which said ambient air through said air inlet hose 112 and thence into an inlet side of an air compressor 700, within which compressor said intake air mass is compressed and makes a passage into a compressed air outlet tube 701, following which after a passage through a V-1 valve 800 said pressurized air makes a further forward flow into a Sieve Bed-1 600 through a Sieve Bed-1 air entry tube 702 and thence a passage into and through a Zeolite media (not shown) in said Sieve Bed-1 as a start of a first charge cycle during which charge cycle an adsorption of a N component onto a surface of said Zeolite media leads to a creation of a Hi-OSub2 product component of said air mass, which Hi-OSub2 air mass, under a continuing pressure from said Compressor 700, is next driven out of said Media Bed-1 600 into a media bed-1 exit tube 703 and thence into an exit from said Condenser unit 111 after a passage through a V-5 valve 805, which is in an open state, thus allowing of a passage of said Hi-OSub2 air mass into an OSub2 enriched air exit tube 114 and thence into an air intake manifold of an ICE (not shown)

It will be noted in FIG. 3 that a trio of valves V-2 802, V-3 803 and V-6 806 are indicated as being in a closed position by a diagonal slash mark across said valve bodies in the illustration. Valve V-7 807 is seen in a central position along a sieve bed interconnecting tube 704; said Valve V-7 is a metering valve which has a functional purpose of allowing a diversion of a small amount of HI-OSub2 air that would otherwise have made an exit into said external environment from said Sieve Bed-1 to make a passage instead through said interconnecting tube 704 and thence into a reverse flow through a Sieve Bed-2 620;

As said first charge cycle is nearing an end as said Zeolite becomes saturated with an adsorbed N component of said intake air stream and said Hi-OSub2 air mass component is driven towards said OSub2 enriched air exit tube 114, said metered amount of said Hi-OSub2 makes said passage through said sieve bed interconnecting tube 704 and into a reverse flow through said Sieve Bed-2 620 and a passage through a Zeolite media in said Sieve Bed-2, where in concert with said reverse flow of said Hi-OSub2 a lower pressure in said Bed-2 brings a Hi-N-Low-OSub2 air mass into a passage out of said Sieve Bed-2 through a Sieve Bed-2 compressed air entry tube 706 wherein said V-2 802 is seen to be in a closed position and thereby provides a prevention of a passage of said HI-N-Low-OSub2 air mass back against any incoming hi-pressure air from said compressor 700; meanwhile, a valve V-4 804, which is in an open flow position allows said HI-N-Low-OSub2 air mass to make a passage forward towards and an eventual exit from said Condenser unit via a media bed waste air connector tube 707 thence into a waste air purge outlet 912 which purge tube exhausts said exiting HI-N-Low-OSub2 air into an outside environmental air mass; it is also illustrated in FIG. 3 that a Valve V-3 803 is in a closed position during this first charge cycle, thereby preventing said reverse flow of an exiting HI-N-Low-OSub2 from blending back into said Sieve Bed-1 air entry tube 702.

Next, after an appropriate time interval, usually a few seconds, after said media 600 in Sieve Bed-1 has become saturated with N, and said Hi-OSub2 air mass has been forced out through said waste air purge outlet hose 912, a reversal of the Charge cycle process occurs, and said compressor 700 makes a feed forward of a pressurized air stream into Sieve Bed-2; in this second charge cycle, the process is reversed and: the following valves are cycled into an open position: V-2 802, V-3 803 and V-6 806 while V1 801, V-4 804 and V-5 805 are cycled into a closed position; V-7 807 allows a reverse flow of a metered amount of a HI-OSub2 air mass into Sieve Bed-1, leading to a de-adsorption and renewal of effectiveness of said media in Sieve Bed-1; and the forward compression of air into said Sieve Bed-2 from said compressor leads to an adsorption of N molecules onto said Zeolite media, with a concomitant condensation of an OSub2 component of said intake air within said Sieve bed-2 and an eventual direction of said Hi-OSub2 air mass into said air intake manifold of said ICE This process is repeated At a previously determined time interval and is able to deliver a semi-continuous stream of high quality air.

Conclusionary Clarifications

Thus, it is seen that an oxygen concentrating device and system for a specific usage in an internal combustion engines is provided. One skilled in the art will appreciate that the present invention can be practiced by other than the various embodiments and preferred embodiments, which are presented in this description for purposes of illustration and not of limitation, except as such limitation may be specifically noted in the disclosure drawings and claims, and, the present invention is limited only by the claims that follow. It is noted that equivalents for the particular embodiments discussed in this description may practice the invention as well.

While various embodiments of the present invention have been described above, it should be understood that they have been presented by way of example only, and not of limitation, except as such limitation may be specifically noted in the disclosure drawings and claims. Likewise, the various diagrams may depict an example of an architectural or other configuration for the invention, which is done to aid in understanding the features and functionality that may be included in the invention. The invention is not restricted to the illustrated examples of an architectural or other configurations, but the desired features may be implemented using a variety of alternative architectures and configurations, except as such limitation may have been illustrated in the illustrations. Indeed, it will be apparent to one of skill in the art how alternative functional, logical or physical partitioning and configurations may be implemented to implement the desired features of the present invention unless such implementation should include provision of an alteration of a limitation specifically noted in the disclosure, drawings and or claims, or result in an inability of the invention to perform its intended purpose as taught in this invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various preferred embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment, unless the context dictates otherwise. Thus the breadth and scope of the present invention should not be limited by any of the above-described exemplary embodiments unless such limitation has been specifically taught in the disclosure, shown in the illustrations and or claimed in the Claims.

Terms and phrases used in this document, and variations thereof, unless otherwise expressly stated, should be construed as being open ended as opposed to limiting in nature. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the terms "module" or "component" do not imply that the components or functionality described processes or events or claimed as part of the module or component are all configured in a common package within a common location; indeed, any or all of the various portions of a module or other components may be combined in a single package or separately maintained and may further be distributed across multiple locations, unless specifically indicated in the disclosure, drawings, claims or unless the context dictates otherwise.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration unless specifically indicated in the disclosure, drawings, claims or unless the context dictates otherwise.

OTHER CONSIDERATIONS

Based on the above stated conclusionary qualifications, it will be apparent to one skilled in the art that a use of a pre-fabricated PSA Concentrator unit is not a limitation of the invention as taught herein. Rather such use was specifically intended for a clarification of how such a process operates within a framework best allowing a disclosure and illustrations that would enable a person knowledgeable in the art to re-create the invention.

Using such an understanding, it is possible to create modifications of the embodiments presented that allow of a segmental placement of the basic components of a PSA process unit within a vehicle of other housing used for an operation involving an ICE as long as the cardinal features newly taught herein are kept in place within the new embodiment; that is, any embodiment, however the other pertinent parts of a condenser unit: including a compressor, a set of connecting air-flow tubes, a set of air-flow directional control valves, an adsorptive media and a power source are situated, two specific structural arrangements must be carried forward as taught herein in any embodiment;

A First Limitation that must be preserved being that a filtered entry intake hose 112 FIG. 3 providing for an entry of a quantity of an ambient air mass 257 FIG. 3 into a sieve bed 600/900 FIG. 3 of said Concentrator assembly 111 FIG. 3, must be in a location such that said filtered ambient air entry intake hose 112 FIG. 3, is in an externally facing attachment to any surface of any component of an enclosing housing of said ICE 200 as seen in FIG. 1 such that said externally facing attachment creates a provision for a flow of said ambient air mass to be drawn from a location situated externally to any body component of a vehicle housing, or any enclosure other housing said ICE;

A Second Limitation being that a waste air purge outlet hose 912. FIG. 1, must be in a situation that a waste air mass exiting said hose 912 shall make an exit directly out into an environmental air mass external to any body component of a vehicle housing, or any other enclosure housing said ICE; by virtue of an attachment of a terminal end of said waste air purge outlet hose 912 to an external wall of any such ICE enclosure in a manner allowing of a passage of said waste air out through said wall and into said external ambient air mass.

What is claimed is:

1. A use of an oxygenating device commonly used to provide a Hi-Osub2 air mass for use by persons requiring an intake of oxygenated air of higher Osub2 than that found in ambient air typically for breathing helping with breathing related problems,
    wherein said device, a pressure swing appliance (PSA) (110) is adapted to provide a HI-OSub2 air mass (OSub2-2) (258) for delivery to a combustion assembly (250) of an internal combustion engine (ICE) (200)
    and wherein said ICE (200) is housed within an engine compartment (555) of a multi-compartment body section comprised of a plurality of enclosed body compartments (555/560),
    and wherein said PSA (110) is situated within an enclosed body compartment (560) separate from said engine compartment (555),
    said PSA (110) comprising in part an oxygen concentration component (a Concentrator) (111),
    said Concentrator (111) comprising in part an integral Concentrator housing component (100), and further comprising in part, an integral air compressor component (700),
        said air compressor (700) capable of creating an air mass (258) at a higher pressure level than that of an ambient atmospheric air mass (257),
        said Concentrator (111) further comprising in part a filtered air intake tube component (112), which said air intake (112) is separate from an air intake component (251) of said ICE (200),
            said intake air tube (112) having an originating orifice located in an attachment at an outer wall portion of said multi-compartment body section (555/560), providing thereby that said origination of said air intake tube (112) is in a direct contact with an externally situated ambient air mass (257), and,
            said intake air tube (112) having an internal termination at and with an inlet side of said integral air compressor (700) component;
    said Concentrator (111) further comprising in part at least two sieve beds (600/620), a sieve bed-1 (600) for receiving and expelling air, and a sieve bed-2 (620) for receiving and expelling air,
        in combination the locations of said origination and said termination of said intake air tube (112) structurally defining a direct fluid communication between said externally situated environmental air mass (257) said compressor component (700) and said sieve beds (600/620) of said Concentrator (111),
    said Concentrator (111) further comprising in part a plurality of tubes (701,702,703,704,705,706,114 & 912) interconnecting between
        themselves, said air compressor said combustion assembly (250) of said ICE and said ambient externally situated air mass (257),
    a series of valves (v-1 through v-7 inclusive) situated within said plurality of tubes operable to control said movement of said pressurized air mass created by said air compressor (700) into and through said sieve beds (600/620) such that:
        when air under pressure is being delivered into sieve bed-1 (600) by said air compressor (700) during a Nitrogen adsorption cycle of sieve bed-1 (600), a flow of said air under pressure into sieve bed-2 (620) is prevented by a first combination of said set of valves (V-1 thru v-7 inclusive),
        and, subsequent to a cyclical reversal of the pressurization phase from sieve bed-1 (600) to sieve bed-2 (620), during said Nitrogen adsorption cycle of sieve Bed-2 (620) when said air under pressure is being delivered into sieve bed-2 (620) said flow of air under pressure into sieve bed-1 (600) is prevented by
    a second combination of said set of valves (V-1 thru v-7 inclusive), said sieve bed-1 (600) and said sieve bed-2 (620) each being cyclable between:
        said Nitrogen adsorption cycle created by a movement through said sieve bed-1 (600) or said sieve bed-2 (620) of said pressurized air mass (258) under said pressure provided by said integral air compressor component (700) of said Concentrator (111),
        and sequentially, when said compressor component (700) is not providing said pressurized air mass into one or the other of said respective sieve beds (600/620), that respective sieve bed (600/620), is exposed to a lowering of pressure as part of a Nitrogen desorption cycle,
    a passageway between each of said sieve beds (600/620) and said externally situated ambient air mass (257) via a media bed waste air connector tube (707) and a waste air purge outlet tube (912),
        a terminal orifice of which said waste air purge outlet tube (912) being located in an externally facing attachment at an outer wall portion of said enclosure compartment (650) housing said Concentrator (111), such that said orifice is in a direct contact with said ambient, externally situated air source (257),
    a sieve bed-1 exit tube (703), through an interconnection with an oxygen enriched supply tube (114), providing for said delivery of said oxygen enriched air mass (258) from said sieve bed-1 (600) into said combustion assembly (250) of said ICE (200),
    a sieve bed-2 (620) exit tube (705) through an interconnection with said oxygen enriched supply tube (114), providing for said delivery of said oxygen enriched air mass (258) from said sieve bed-2 (620) into said combustion assembly (250) of said ICE (200).

2. A method for providing a hyper-oxygenated air mass (258) to an internal combustion engine (ICE) (200),
  in which the engine (200) is enclosed within an engine compartment (555) of a multi-compartment housing (555/560), and, wherein an oxygen concentration assembly (Concentrator) (111), is located in a separate compartment (560) from the engine compartment (555) within the multi-compartment housing (555/560),
  and, wherein the Concentrator (111) has an air intake (112) separate from an engine air intake (251/252) of the ICE (200), and wherein the Concentrator's air intake (112) provides a direct fluid connection between the Concentrator (111) and an ambient environmental air mass (257),
    which said air mass (257) is situated externally to the multi-compartment housing (555/560), such that a quantity of the ambient environmental air (257) that is to be hyper-oxygenated passes through the Concentrator (111) prior to having been exposed to a high temperature in the engine compartment (555),
  following which the hyper-oxygenated air (258) exits through an oxygen enriched supply hose (114), which said supply hose (114) makes a passage from said body compartment (560) housing said Concentrator (111) into said engine compartment (555) for delivery of said hyper-oxygenated air mass (258) into a combustion assembly (250) of the ICE (200),
  comprising the steps of,
A. providing a pair of molecular sieve beds (600/620) for receiving and expelling air, a first molecular sieve bed, Sieve Bed-1 (600) and a second molecular sieve bed, sieve bed-2 (620),
  said sieve bed-1 and said sieve bed-2 (600/620), each having the property of,
    adsorbing at least a portion of nitrogen from air moving there through under pressure, such that air expelled there-from (258) has a higher concentration of oxygen than the ambient atmospheric air (257),
    desorbing at least a portion of the nitrogen upon being exposed to a lowering of pressure within the respective sieve bed (600/620),
B. delivering air to and through the sieve bed-1 (600) under pressure higher than that of the ambient environmental air mass (257) to form the hyper-oxygenated air mass (258),
C. delivering the hyper-oxygenated air mass (258) from sieve bed-1 into said combustion assembly (250) of the ICE (200),
D. stopping step B.,
E. delivering air to and through the sieve bed-2 (620) when the delivery of air to and through sieve bed-1 (600) of step B. is stopped,
F. delivering the hyper-oxygenated air mass (258) from sieve bed-2 (620) to the combustion assembly (250) of the ICE (200),
G. venting air to an external environmental air mass (257) from sieve Bed-1 (600) when the delivery of air to and through sieve bed-1 (600) of step B is stopped,
H. venting air to an external environmental air mass (257) from sieve bed-2 (620) when the delivery of air to and through sieve bed-2 (620) of step E. is stopped,
I. diverting a small amount of hyper-oxygenated air (258) that would otherwise have made an exit into an external environmental air mass (257) from sieve bed-1 (600) in a reverse flow passage instead into and through sieve bed-2 (620),
J. diverting a small amount of hyper-oxygenated air (258) that would otherwise have made an exit into an external environmental air mass (257) from sieve bed-2 (620) in a reverse flow passage instead into and through sieve bed-1 (600),
K stopping the delivery of air under pressure higher than that of the ambient environmental air mass (257) to and through the sieve bed-1 (600) of step B. and initiating the delivery of air under pressure higher than that of the ambient environmental air mass (257) to and through sieve bed-2 (620) of step E at a predetermined time interval,
L performing a reverse process to that of step K at the predetermined time interval,
M. providing a semi-continuous stream of hyper-oxygenated air (258) delivered into the combustion chamber (210) of the ICE (200), alternatingly from said sieve bed-1 (600) and said sieve 2ed-2 (620).

* * * * *